US005333755A

United States Patent [19]

Wang et al.

[11] Patent Number: 5,333,755

[45] Date of Patent: Aug. 2, 1994

[54] METHOD OF MANUFACTURE OF A STATIC MIXING DISPENSER

[76] Inventors: Scott G. Wang, 846 Harborview Rd., Hudson, Wis. 54016; Bruce A. Wang, 505 Valley View Trail, Houlton, Wis. 54082

[21] Appl. No.: 948,226

[22] Filed: Sep. 21, 1992

[51] Int. Cl.[5] .......................... B67B 7/00; G01F 11/00

[52] U.S. Cl. ........................................ 222/1; 222/459; 222/153; 222/566; 215/246; 174/DIG. 8; 428/34.9; 428/35.1

[58] Field of Search ................................ 222/135-137, 222/145, 541, 459, 153, 566, 1; 215/201, 246; 428/34.9, 35.1; 174/DIG. 8

[56] References Cited

U.S. PATENT DOCUMENTS 1,149,532 8/1915 Morford .......................... 428/35.1 X
2,500,639 3/1950 Lermer ........................... 222/566 X
3,217,946 11/1965 Cook .................................. 222/386
4,448,824 5/1984 Holmes et al. ................. 428/34.9 X
4,620,647 11/1986 Woodworth et al. .......... 222/566 X
4,633,648 1/1987 Yeung ............................ 215/246 X
4,767,026 8/1988 Keller et al. ........................ 222/137
4,801,008 1/1989 Rich ................................... 206/219
4,950,237 8/1990 Henault .......................... 222/153 X
4,995,540 2/1991 Colin et al. ..................... 222/459 X
5,143,761 9/1992 Chiotis et al. ............ 174/DIG. 8 X
5,181,632 1/1993 Latter ............................ 215/246 X

FOREIGN PATENT DOCUMENTS 0122134 6/1985 Japan ................................. 428/35.1

OTHER PUBLICATIONS

Liquid Control Corp. Posimixer Luer Lock Needle Adapter Brochure, 1990.

*Primary Examiner*—Andres Kashnikow
*Assistant Examiner*—Kenneth D. DeRosa
*Attorney, Agent, or Firm*—Joel D. Skinner

[57] ABSTRACT

This invention provides a method of assembling a liquid applicator structure having a static mixing member with a input and an output end and a nozzle member disposed at the output end of the mixing member, comprising the steps of providing a static mixing member; providing a nozzle member; depositing a predetermined amount of an adhesive on the output end of the static mixing member; connecting the nozzle member to the output end of the static mixing member; and applying a retention structure over a predetermined segment of the mixing member and the nozzle member. Also provided is an applicator apparatus for dispensing viscous livid compounds, and for use with supply and drive means for the compounds, comprising: a static mixing member having an input end and an output end; a nozzle member connected to the output end of the static mixing member; a retention structure disposed over and coupling predetermined segments of the mixing member and the nozzle member; and wherein the static mixing member and the nozzle member are adhesively bonded together.

8 Claims, 2 Drawing Sheets

METHOD OF MANUFACTURE OF A STATIC MIXING DISPENSER

BACKGROUND OF THE INVENTION

This invention relates to apparatus, and methods of manufacture therefor, for dispensing and/or mixing liquid compounds. More particularly, this invention relates to static mixing devices and related assembly methods. The term static mixer as used herein refers to an apparatus wherein compounds are mixed via stationary or motionless means. The apparatus of this invention is useful for mixing and dispensing multicomponent resins, such as adhesives, onto a predetermined work area. The method of the invention is useful for manufacturing the above-mentioned apparatus.

In the past, various devices and/or methods have been used and proposed to mix and dispense liquid adhesives, particularly multicomponent adhesive compounds. However, these devices and methods have significant limitations and shortcomings. A common device, the disposable static mixer, is used with standard gun-type dispensing mechanisms utilizing replaceable dispenser cartridges to both mix reactive components and to deposit the resultant mixture in a bead or dot configuration or pattern, for example. However, known static mixers do not function well in relatively low volume applications and in certain narrow or extreme deposition environments. The addition of a thin nozzle or needle at the output end of the static mixer provides improved control of the deposition volume and configuration. However, problems exist with respect to the means of connection for such nozzles. For example, an adapter structure has been shown to be bulky, unreliable and expensive. A particular problem with prior art connection means and methods exists in that the nozzles are prone to become disconnected from the mixer during the dispensing of highly viscous compounds, for example those having viscosities greater than approximately 20,000 centipois as measured by a Brookfield Tester.

Various methods have been used and proposed to manufacture the above-mentioned devices. These methods too, have been shown to have significant limitations, as well as yielding devices which are less than satisfactory.

Despite the need in the art for a device, and method of manufacture therefor, which overcomes the limitations and problems of the prior art, none insofar as is known has been proposed or developed. Accordingly, it an object of the present invention to provide a device which overcomes the limitations and shortcomings of the prior art. Particularly, it is an object of this invention to provide an improved static mixer structure which is reliable, durable, disposable, inexpensive, low profile, effective at depositing relatively low volumes of viscous liquid resins, and in controlled configurations, and which is effective at depositing such compounds in extreme environments. It is also an object of the present invention to provide a method or process of manufacturing or assembling a static mixer structure having the foregoing advantages, and which is relatively simple, reliable and inexpensive.

SUMMARY OF THE INVENTION

The present invention provides a method of assembling an applicator structure, for dispensing viscous liquid compounds, of the type having a static mixing member with an input and an output end, and a nozzle member disposed at the output end of the mixing member, comprising the steps of:

a) providing a static mixing member;
b) providing a nozzle member;
c) applying a primer at least on the mixing member;
d) depositing a predetermined amount of a cyanoacrylate adhesive on the output end of the static mixing member;
e) connecting the nozzle member to the output end of the static mixing member; and
f) applying a heat shrink-type retention structure over a predetermined segment of the mixing member and the nozzle member.

The invention further provides an applicator apparatus for dispensing viscous, multicomponent liquid compounds, and for use with cartridge supply and drive means for inputting compounds to the applicator apparatus, comprising:

a) a static mixing member having an input end and an output end, the mixing member comprising an elongated cylindrical structure having a central, axial lumen, and a mixing vane structure disposed in the lumen, and wherein coupling means is disposed at the input end thereof, and the output end has a tapered, stepped configuration consisting of a plurality of coaxial rings extending longitudinally outwardly from the output end, each of a progressively lesser diameter than its preceding neighbor ring;
b) a nozzle member connected to the output end of the static mixing member, the nozzle member comprising a coupling base and a hypotube, the coupling base having an input end, an output end and a central axial lumen extending from the input end to the output end, the hypotube being coupled to the output end of the base and having a central axial lumen which is communicatively connected to the base lumen;
c) a shrink wrap retention structure disposed over and coupling predetermined segments of the mixing member and the nozzle member; and
d) wherein the static mixing member and the nozzle member are adhesively bonded together via a cyanoacrylate.

These and other benefits of this invention will become clear from the following description by reference to the drawings.

DESCRIPTION OF THE PREFERRED EMBODIMENT

A variety of useful multicomponent resinous compounds exist, such as adhesives, potting compounds, foams and sealants. These compounds typically comprise two or more viscous liquid or semi-liquid components which are stored in separate containers and which chemically react upon being brought into contact with one another and mixed to form a desired product, typically a solid or semi-solid. In industry, systems or apparatus for utilizing these multicomponent compounds consist of a replaceable multichambered or barreled storage cartridge which may also be disposable or reusable, a gun-type drive or dispensive unit including plungers or pistons which act on the inlet ends of the cartridge chambers, and a disposable static mixer which is attachable to the outlet ends of the cartridge chambers and serves to mix the separated reactive components and also serves to dispense, at its outlet end, the mixed compound in a desired configuration or pattern, such as a bead or dot.

The mixer apparatus of this invention is usable with a variety of viscous compounds and for various applications, although it is particularly useful for mixing and dispensing epoxy and other adhesives in relatively low volume applications where the adhesive may be required to be deposited in a precise location and in relatively narrow or tight confines or environments. The mixer apparatus is usable with pneumatic, hydraulic, mechanical or electromagnetically powered dispensing guns or mechanisms.

Figure 1:
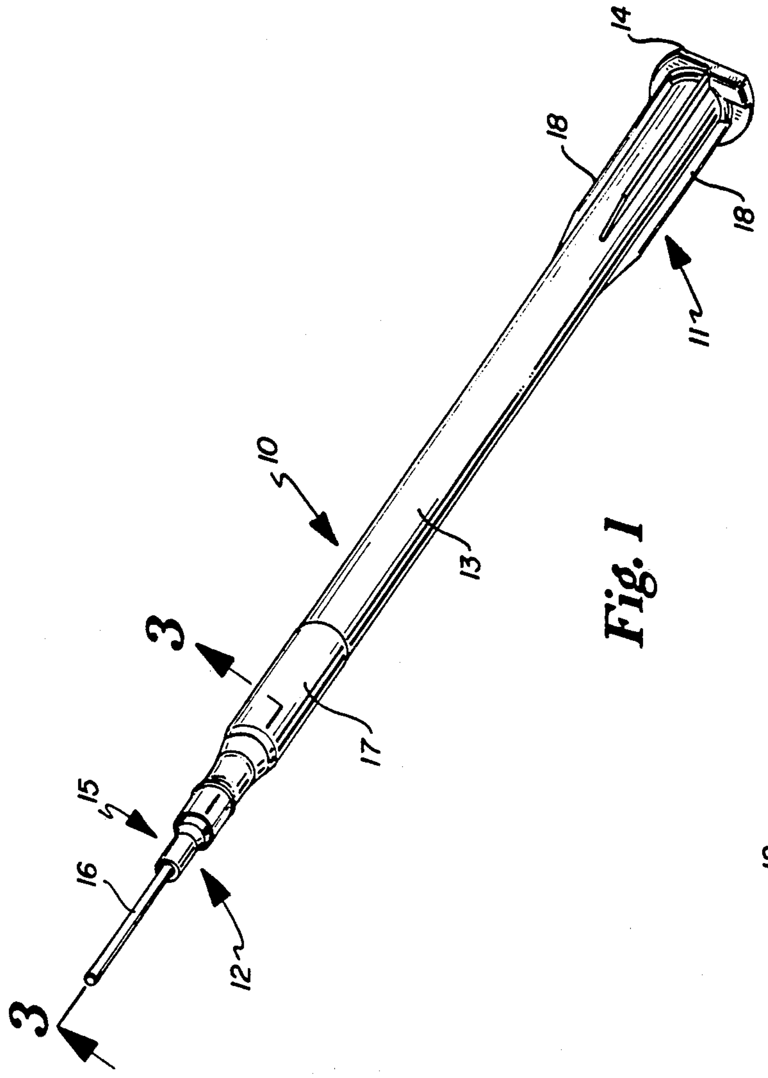
FIG. 1 is a perspective view of the apparatus of the present invention.

Referring to FIG. 1, the static mixer apparatus 10 of the present invention generally includes an elongated cylindrical tube or body 13 with an inlet end 11 and an outlet end 12. Attached to the outlet end 12 is a needle-type nozzle 15, over which is disposed a tubular shrink wrap sleeve 17. A needle or hypotube 16 is shown extending from the outlet end of the nozzle 15. The inlet end 11 is provided with a bayonet-style quarter-turn fastener 14 for mating with a complimentary structure at the outlet orifice of the storage cartridge (not shown ).

Figure 2:
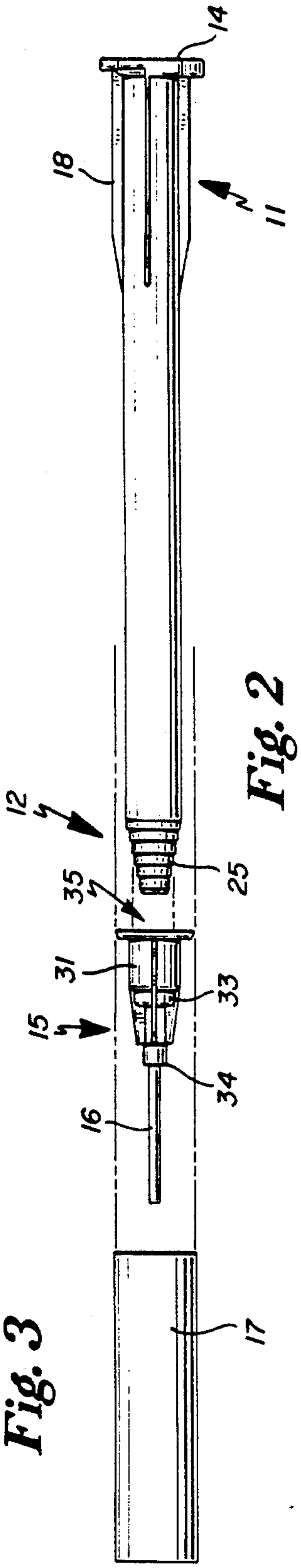
FIG. 2 is an exploded view of the apparatus shown in FIG. 1, showing several of its components.
Figure 3:
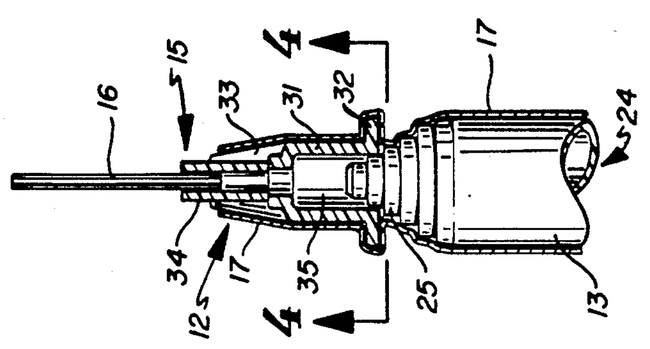
FIG. 3 is a detailed view of the outlet end of the apparatus, partially in crossection.
Figure 4:
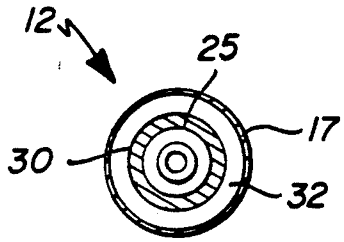
FIG. 4 is a crossectional view of the apparatus, taken along line 4—4 of FIG. 3.

Referring also to FIGS. 2–4, the mixer body 13 has an elongated tubular structure with a central lumen or barrel 24 which is open at each end 11 and 12. The mixer body 13 is preferably constructed of a plastic material. A plurality of ribs 18 are shown to extend longitudinally from the fastener structure 14 to provide rigidity to the body 13. The output end of the mixer body 13 has a tapered stepped structure 25, which is commonly provided on mixer bodies known in the art to allow the user to vary the diameter of the outlet orifice. The end structure 25 has a plurality of coaxial rings which extend longitudinally outwardly from the end. Each ring has a progressively smaller diameter than its preceding, inwardly disposed neighbor ring. The mixer body 13 also includes a plurality of twisted, stacked mixing vanes (not shown) disposed on the interior of the lumen 24. The mixing vanes cause a mixing of the reactive components as they travel along the length of the mixer body 13 under pressure from the dispensing gun. Although a particular mixer body embodiment is disclosed, alternative embodiments of the mixer are usable consistent with the general teachings of this invention.

The nozzle 15 is shown to include a body 31 having a plurality of structural ribs 33, a base portion 32 disposed about the inlet end of the body 31, an extension portion 34 disposed at the outlet end of the base 31, and the needle 16 which is shown inserted a predetermined distance in the extension portion 34. A central lumen 35 extends from the open inlet end of the body 31 to the outlet end and is communicatively connected to the hollow extension portion 34 and to the needle 16. These structures may be constructed of various materials. The body 31, base portion 32 and extension portion 34 preferably comprise a unitary structure composed of a plastic material such as polyproplyene. Various metallic compositions are also known, for example those made of aluminum. The needle is commonly constructed of stainless steel or the like. Known nozzles 15 are available in a variety of needle lengths ranging from 0.5 to 3.0 inches (12.7 to 76.2 millimeters) in length, and orifice sizes ranging for example from 0.0025 to 0.125 inches (0.06 to 3.17 millimeters) in diameter.

Importantly, the nozzle 15 is adhesively bonded to the mixer body 13. As is best shown in FIG. 4, a thin layer 30 of an adhesive, preferably a cyanoacrylate, is disposed between the surface of the stepped portion ring 25 and the lumen wall of the base portion 32. Also, the retention sleeve 17 is disposed over the exterior surfaces of a major portion of the nozzle body 31 and the output end of the mixer body 13. The sleeve 17 is a tubular structure approximately one inch in length, sufficient to cover the nozzle body 31 and a portion of the mixer 13. The sleeve is formed of a polymeric substance which exhibits a predetermined radial shrinkage upon being subjected to heating at a temperature in the range of approximately 90 to 150 degrees Celsius. The sleeve 17 is shown in its shrunken state forming a semi-flexible retaining and stabilizing skin structure over the above-mentioned portions of the apparatus 10, which increases the tensile strength of the overall structure.

The adhesive bond between the nozzle 15 and the mixer body 13, in cooperation with the retention properties of the sleeve 17, yield a mixing and dispensing structure having low volume or thin bead deposition capabilities, which is extremely reliable and durable. Hence, the output end of the needle 16 may, for example, be repeatedly inserted into and removed from tight, narrow, and angled application environments while being moved, and with improved performance and decreased incidence of failure or breakdown. The resulting structure is also capable of mixing and dispensing highly viscous compounds, such as those having viscosities greater than approximately 20,000 centipois. Moreover, such viscous compounds may be processed through apparatus 10 utilizing longer needle lengths and/or smaller needle diameters. Prior art structures tend to fail under such conditions due to the high back pressures generated during use. Finally, a significant decline in post-actuation dripping has been observed in apparatus having the above-described structure.

Figure 5:
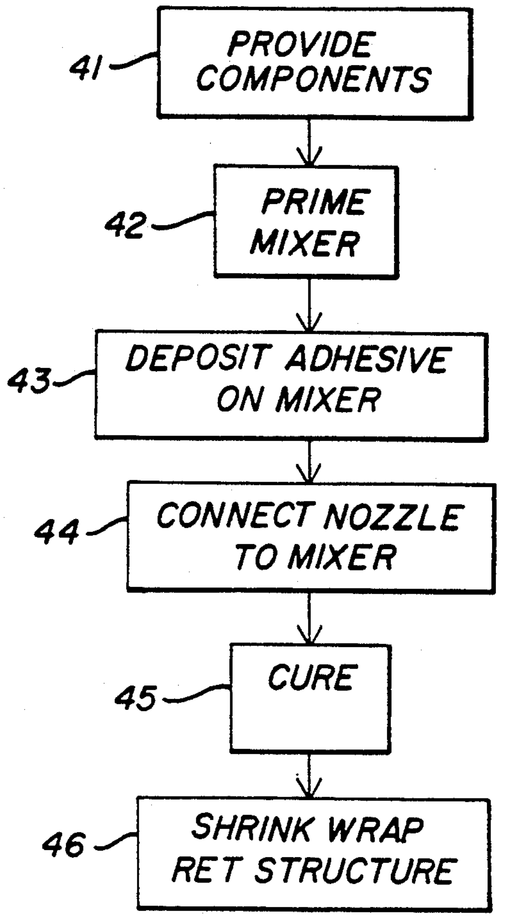
FIG. 5 is a flow diagram of one embodiment of the method of the present invention.

Referring to FIG. 5, one version of the method of assembling the mixer/applicator apparatus described above, is shown. The manufacturing process proceeds in a step-wise fashion subsequent to the initial step 41 of providing a mixing member with an input end and an output end, and a nozzle member having a metallic body structure. The next step 42 involves the application of a primer compound of the type commonly used to prepare a plastic surface for adhesive bonding, to the output end of the mixing member. In the next step 43, a predetermined amount ranging from one-tenth of one drop to two drops of an adhesive, preferably a cyanoacrylate, is deposited on the exterior surface of the output end of the mixing member. It has been found that the third step 43 is preferably executed within approximately 30 minutes of the second step 42. The next step 44 involves establishing a communicative connection between the nozzle inner luminal surface and the adhesive coated output end of the mixer. In the next step 45, the connected assembly is cured by allowing it to set, substantially undisturbed, for a predetermined time period ranging from several seconds to 15 minutes. The final step 46 of the assembly process involves the application of the retention sleeve. This is accomplished by inserting an unprocessed sleeve blank of a diameter slightly larger than that of the mixer member, over the mixer member and adjusting its position so that the distal or output end of the sleeve blank is aligned with the output end of the nozzle body portion, but does not overlap the needle portion thereof. This assembly is then heated in an oven mechanism for a predetermined time period ranging from approximately 5 seconds to 11 minutes at a temperature ranging from 90 to 150 degree Celsius. The completed assembly is then removed from the oven for cooling and subsequent testing and/or packaging. The apparatus produced by this method has all of the structural and functional advantages described above with respect to the apparatus of this invention.

Figure 6:
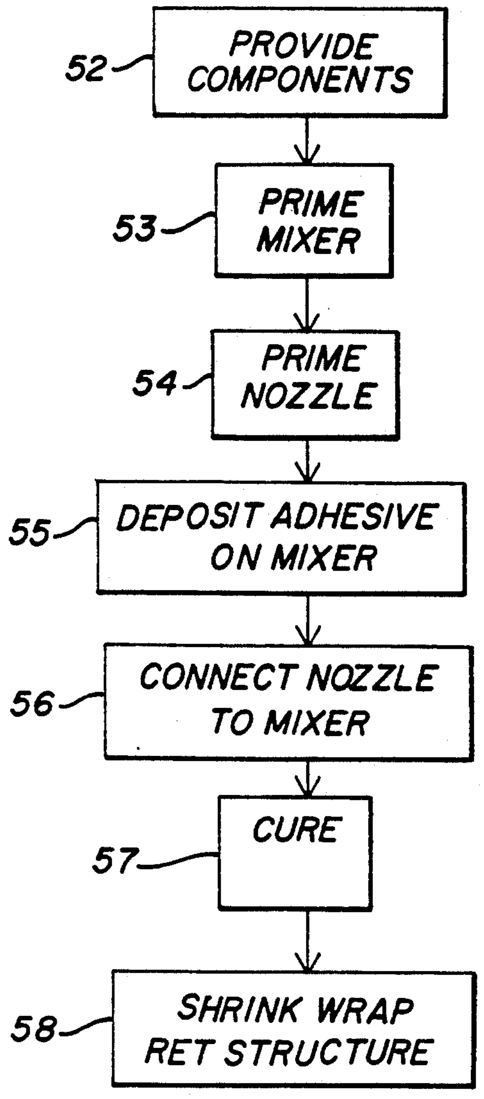
FIG. 6 is a flow diagram of another embodiment of the method of the invention.

Referring to FIG. 6, an alternative version of the method of assembling the mixer/applicator apparatus described above, is shown. The manufacturing process proceeds in a step-wise fashion subsequent to the initial step 52 of providing a mixing member with an input end and an output end, and a nozzle member having a plastic body structure. The next step 53 involves the application of a primer compound to the output end of the mixing member. The following step 54 involves applying a primer to the inner luminal surface of the plastic nozzle body portion. In the next step 55, a predetermined amount of a cyanoacrylate adhesive is deposited on the output end of the mixing member. The fourth step 55 is preferably executed within approximately 30 minutes of the second and third steps 53 and 54. The next step 56 involves establishing a communicative connection between the nozzle inner luminal surface and the adhesive coated output end of the mixer. In the next step 57, the connected assembly is cured by allowing it to set, substantially undisturbed, for a predetermined time period. The final step 58 of the assembly process involves the application of the retention sleeve. This is accomplished by inserting an unprocessed sleeve blank of a diameter slightly larger than that of the mixer member, over the mixer member and adjusting its position so that the distal or output end of the sleeve blank is aligned with the output end of the nozzle body portion, but does not overlap the needle portion thereof. This assembly is then heated in an oven mechanism for a predetermined time period at a temperature ranging from 90 to 150 degree Celsius. The completed assembly is then removed from the oven for cooling and subsequent testing and/or packaging.

As many changes are possible to the embodiments of this invention utilizing the teachings thereof, the descriptions above, and the accompanying drawings should be interpreted in the illustrative and not the limited sense.

That which is claimed is:

1. A method of assembling a low volume applicator for compounds having a viscosity greater than 20,000 centipois having a static mixing member with a input and an output end and a nozzle member disposed at the output end of the mixing member, comprising the steps of:

a) providing a static mixing member;

b) providing a nozzle member having a body member and a needle member with a length of at least 12.7 mm. and an orifice diameter not greater than 3.17 mm.;

c) depositing a predetermine amount of an adhesive on the output end of the static mixing member;

d) connecting the nozzle member to the output end of the static mixing member;

e) positioning a heat shrink sleeve having a distal end and a proximal end over a predetermined segment of the mixing member and the nozzle member so that the distal end of the sleeve is aligned with an output end of the nozzle body member;

f) heating the applicator for a predetermined time period sufficient to cause the positioned sleeve to form a tight, semi-flexible retaining and stabilizing skin structure around the mixing member and nozzle body member; and g) curing the applicator by allowing it to set for a predetermined time period.

2. The method of assembling of claim 1, further comprising a step of applying a primer on the mixing member prior to said adhesive deposition step.

3. The method assembling of claim 2, further comprising a step of applying a primer on the nozzle member prior to said adhesive deposition step.

4. The method of assembling of claim 2, wherein said primer is a plastic surface primer.

5. The method of assembling of claim 1, wherein said adhesive is a cyanoacrylate.

6. The method of assembling of claim 1, wherein said adhesive is deposited in an amount ranging from one-tenth of one drop to two drops.

7. The method of assembling of claim 1, wherein the mixing member output end has a tapered, stepped outside surface consisting of a plurality of coaxial rings extending longitudinally outwardly from the output end, each of a progressively lesser diameter than its preceding neighbor ring, wherein the nozzle body member has a smooth longitudinally continuous inside surface forming a central lumen which is coextensive with the needle, and wherein step (d) is accomplished by aligning a coaxial ring on the outside surface of the mixing member with the inside surface of the nozzle body member and establishing contact between such surfaces.

8. A method of assembling an applicator structure, for dispensing liquid compounds having a viscosity greater that 20,000 centipois, of the type having a static mixing member with an input and ann output end, and a nozzle member disposed at the output end of the mixing member, comprising the steps of:

a) providing a static mixing member, the static mixing member output end having a tapered, stepped outside surface consisting of a plurality of coaxial rings extending longitudinally outwardly from the output end, each of a progressively lesser diameter than its preceding neighbor ring;

b) providing a low volume dispensing nozzle member having a body member and a needle member with a length of at least 12.7 mm. and an orifice diameter not greater than 3.17 mm., the body member having a longitudinally continuous inside surface forming a central lumen which is coextensive with the needle;

c) applying a primer on the mixing member output end outside surface;

d) applying a primer on the nozzle member body inside surface;

e) waiting a predetermined time period not greater than 30 minutes;

f) depositing a predetermined amount of a cyanoacrylate adhesive on the output end of the static mixing member;

g) aligning a coaxial ring on the outside surface of the mixing member with the inside surface of the nozzle body member and establishing contact between such surfaces;

h) positioning a heat shrink-type tubular retention structure, having a distal end and a proximal end, over a predetermined segment of the mixing member and the nozzle member so that the distal end of the sleeve is aligned with an output end of the nozzle body member;

i) heating the applicator structure for a predetermined time period sufficient to cause the sleeve to form a tight, semi-flexible retaining and stabilizing skin structure; and j) curing the applicator structure by allowing it to set for a predetermined time period.

* * * * *